United States Patent [19]

Forgacs et al.

[11] Patent Number: 5,201,221
[45] Date of Patent: Apr. 13, 1993

[54] FLOW SENSOR AND METHOD OF MANUFACTURE

[75] Inventors: Robert L. Forgacs, Dearborn Heights; John L. Bomback, Plymouth; Shaun L. McCarthy, Ann Arbor, all of Mich.

[73] Assignee: Ford Motor Company, Dearborn, Mich.

[21] Appl. No.: 670,120

[22] Filed: Mar. 15, 1991

[51] Int. Cl.⁵ ............................................. E01F 1/68
[52] U.S. Cl. ............................................. 73/204.26
[58] Field of Search ............ 73/204.22, 204.23, 204.25, 73/204.26

[56] References Cited

U.S. PATENT DOCUMENTS

| | | | |
|---|---|---|---|
| 4,343,768 | 8/1982 | Kimura | 422/97 |
| 4,448,070 | 5/1984 | Ohyama et al. | 73/204 |
| 4,471,647 | 9/1984 | Jerman et al. | 73/23 |
| 4,478,076 | 10/1984 | Bohrer | 73/204 |
| 4,498,337 | 2/1985 | Gruner | 73/204 |
| 4,548,078 | 10/1985 | Bohrer et al. | 73/204.26 X |
| 4,581,928 | 4/1986 | Johnson | 73/204 |
| 4,594,889 | 6/1986 | McCarthy | 73/204 |
| 4,677,850 | 7/1987 | Miura et al. | 73/204.23 |
| 4,680,963 | 7/1987 | Tabata et al. | 73/204 |
| 4,696,188 | 9/1987 | Higashi | 73/204 |
| 4,735,099 | 4/1988 | Ohta et al. | 73/204 |
| 4,756,190 | 7/1988 | Ohta et al. | 73/204 |
| 4,761,995 | 8/1988 | Ohta et al. | 73/118 |
| 4,770,036 | 9/1988 | Porth et al. | 73/204 |
| 4,777,820 | 10/1988 | Hecht et al. | 73/204.26 |
| 4,783,996 | 11/1988 | Ohta et al. | 73/204.17 |
| 4,829,814 | 5/1989 | Suzuki et al. | 73/118.2 |
| 4,841,769 | 6/1989 | Porth et al. | 73/204.26 |
| 4,843,445 | 6/1989 | Stemme | 357/28 |
| 4,870,860 | 10/1989 | Ohta et al. | 73/204.26 |

OTHER PUBLICATIONS

Huijsing et al., "Monolithic Integrated Direction-Sensitive Flow Sensor" in IEE Transactions on Electron Devices vol. ed. 29, No. 1, pp. 133-136, Jan. 1982.

*Primary Examiner*—Herbert Goldstein
*Attorney, Agent, or Firm*—Peter Abolins; Roger L. May

[57] ABSTRACT

A hot-wire mass air flow sensor includes integral, elongated silicon members with a silicon dioxide coating on which temperature sensitive resistors are deposited. The air flow sensor has an extremely low thermal conductivity material base on which is mounted one or more of the elongate silicon members. This structure maximizes the thermal impedance of the conductive path existing at the ends of the flow sensor resistors and minimizes sensor errors. A method for fabricating the air flow sensor is also provided.

6 Claims, 6 Drawing Sheets

FLOW SENSOR AND METHOD OF MANUFACTURE

BACKGROUND OF THE INVENTION

The present invention relates to measuring air mass flow rate and, more particularly, to a mass air flow sensor which maximizes the thermal impedance of the conductive path existing at the ends of flow sensor resistors and a method of manufacturing the same.

Automotive engine control systems frequently make use of a mass air flow sensor to sense the mass flow rate of air entering the intake duct to the engine. One type of mass air flow sensor employs two temperature sensitive resistors. The first resistor, referred to as the ambient sensor resistor, is essentially unheated by the small monitoring current it carries, so its resistance is a function of the temperature of the air flow in which it is immersed. The second resistor, referred to as the heated resistor, is also immersed in the air flow, but carries an appreciable heating current. When a suitable control circuit is employed to keep the temperature difference between these two resistors constant by varying the current through the heated resistor, this heating current is the measure of the mass flow rate of the air carrying heat away from the heated resistor. If the sensor is mounted in a selected location in a duct where flow conditions are repeatable, a calibration curve can be obtained relating flow through the duct to heating current. Subsequently, monitoring heating current permits determination of mass air flow through the duct.

One known air velocity sensor is a hot film anemometer-type mass air flow sensor. In such hot film wire or hot film anemometer, a thin film wire sensor is deposited on a substrate such as quartz or glass. It is common to use a very fine platinum or tungsten wire freely supported or wound on a ceramic bobbin and maintained at a certain temperature above the intake air temperature by electronic sensing and feedback circuits. Any change in the airflow alters the cooling effect of the air on the heated wire. An electronic circuit can sense the change in the heat transfer rate by monitoring changes in the heating current to maintain the temperature of the wire at a set value.

Hot film anemometer sensors have generally had a low speed of response as a result of the low thermal conductivity of the quartz or glass fiber. Further, great care must be taken in handling the thin film coated quartz fiber in manufacturing the sensor elements. Connecting the quartz fiber or fine wire to a supporting structure and making electrical contact involves time consuming and delicate operation. Electronics used to amplify and power the sensor are placed external to the hot film anemometer sensor, and interconnection between the electronics and the sensor is made by wires. The connections between the sensor element and the interconnection wires are a source of loss of reliability and increased unit costs. This results in limited manufacturing production capacity and increased unit costs.

Other air velocity sensors that are commercially available are commonly of the single hot wire or thermistor type and are typically mounted on the end of a long probe for insertion into an air stream. The temperature drop and the associated change in electrical resistance caused by the cooling effect of the air stream is a measure of the airflow velocity. In these devices the elements are fully exposed to the air stream and are susceptible to breakage and contamination; also the temperature change with airflow is quite nonlinear, and the resulting electrical signal must be carefully linearized by an integrated circuit. Furthermore, such devices are quite expensive and not suitable for large scale mass production.

As a result of these problems, many attempts in the art have been made to produce a flow sensor which utilizes silicon and its semiconductor properties, or a pyroelectric material. These attempts improved the state of the art in some respects, yet remained deficient with respect to many of the characteristics desired in a modern flow sensor. As is known in the semiconductor industry, very fine platinum or tungsten wires may be freely supported on a silicon chip for use in sensors. Any change in the air flow alters the cooling effect of the air on a heated wire. An electronic circuit can sense this change in heat transfer rate and change the heating current so as to maintain the temperature of the heated wire in a prescribed relationship to the temperature of an ambient sensing wire, to permit measurement of mass air flow.

This particular application has been extremely useful in the automotive industry for measuring engine air flow. In that regard, U.S. Pat. No. 4,594,889, issued to McCarthy, provides a method of fabricating a mass air flow sensor including the step of forming a generally planar silicon substrate. A pair of spaced openings are formed through the silicon substrate so that a relatively elongated, thin wire-like silicon region remains between the openings. After a silicon dioxide coating is formed on this silicon substrate, an elongated metal coating is applied to the silicon dioxide on the wire-like silicon region. The device fabricated thereby may be used as a low cost, high speed sensing element, such as a mass air flow sensor for measuring air flow in an electronic engine control system. However, the McCarthy flow sensor incorporates an elongated, thin silicon member which is susceptible to breakage upon impact of particles moving with the fluid to be measured, such as dust particles travelling with the air flow in the intake of an automobile engine control system. Also the heat loss conducted out of the ends of the heated resistor is appreciable due to the high thermal conductivity of silicon.

Another attempt at producing a suitable flow sensor is disclosed in U.S. Pat. No. 4,498,337, issued to Gruner. The Gruner reference discloses a flow sensor having a flat, metal support base or carrier, such as titanium, which supports thin film resistors or sensing elements. Interposed between the metal support base and resistors is an electrically insulating layer such as glass. So as to minimize conductive heat loss through the support base to the structure surrounding the center, portions of the sensor edges which are in contact with the surrounding structure are removed. Although Gruner's use of a metal support base may provide the flow sensor with some degree of mechanical strength, the Gruner flow sensor does not appear to have achieved the combination of high mechanical strength and low conductive heat loss as is desired. More specifically, while Gruner uses a continuous flat sheet to support the electrical insulating layer and sensing/heating elements, there remains a need for not only an electrical insulating layer, but also a thermal insulating layer so as to preclude any conductive heat loss from the sensing/heating elements.

It is seen then that there is a need for a flow sensor which maximizes thermal impedance between sensing element and support. Also, there is a need for such a sensor wherein mass production techniques permit economical fabrication of a large number of sensors at once while eliminating several previously necessary steps. Finally, there remains a need in the art for a method of making the aforementioned flow sensor that permits a more rugged sensor while maintaining low heat conduction to the support.

SUMMARY OF THE INVENTION

The present invention solves these needs by providing an air flow sensor having long, thin cantilevers made of an extremely low thermal conductivity material on which is mounted one or more elongate silicon members supporting temperature sensitive resistors. This structure maximizes the thermal impedance of the conductive path existing at the ends of the flow sensor resistors and minimizes sensor errors. The present invention further provides for a method of manufacturing the air flow sensor.

The present invention maximizes the thermal impedance of the conductive path existing at the ends of flow sensor resistors, thereby creating a number of advantages. First, the present invention reduces potential errors due to non-linearities in the resistance versus temperature curve of the resistor material as the temperature of the flowing air varies. Second, the present invention reduces errors due to variations in the temperature of the structure to which the sensor is mounted. In addition, errors due to oily dirt collecting on the cooler end portions of the heated resistors decreases, as well as errors due to drifts in the electronic control circuitry. Further, the power draw is lowered since less heat is conducted away from the sensor, thereby lowering the power lost in the electronics. Also, the power draw is lower because the section of the heated resistor furthest from the supports can be held at a smaller differential temperature above 200° C., the desired average temperature for oil burn off, further decreasing electronics power loss. Finally, the cross sectional area of the silicon members supporting the temperature sensitive resistors can be increased to give a more rugged device against high velocity air and debris. The increased cross section can also increase the sensitivity of the device to low air flows. The detrimental heat flow out of the ends of the resistors remains low, even though cross sectional area is increased, due to the high thermal impedance of the supports. The use of long, thin cantilevers of low thermal conductivity epoxy to support the resistor-carrying silicon members is, therefore, highly advantageous.

In accordance with one aspect of the present invention, an air flow sensor is provided comprising at least one silicon member having a top side and a bottom side and being attached to a base. At least one temperature sensitive resistor is deposited on an insulating film on the bottom side of the silicon member. Also, electrical conductors are provided on the base to contact the temperature sensitive resistor.

In accordance with another aspect of the present invention, a method for making a flow sensor is provided. The method for making the flow sensor comprises the steps of fabricating at least one silicon member having a top side and a bottom side. At least one temperature sensitive resistor is deposited on an insulating film on the bottom side of the silicon member. Electrical conductors are provided on a base to contact the temperature sensitive resistor. A large number of the silicon members can be simultaneously formed in a single wafer by standard micro-machinery techniques. At the same time the windows that define the silicon members are etched out, notches are etched which will permit all the silicon members to be detached from the remainder of the silicon wafer and attached to the bases simultaneously, as with low resistance epoxy that contacts the temperature sensitive resistors.

Accordingly, it is a feature of the present invention to provide a mass air flow sensor which maximizes the thermal impedance of the conductive path existing at the ends of the flow sensor resistors. It is an advantage of the present invention to provide such a flow sensor which minimizes the errors of the flow sensor as the temperatures of the flowing air and the mounting environment vary. Novel fabrication procedures of the present invention permit the fabrication of a large number of sensors with exceptionally low error sensitivity with decreased manufacturing costs. The present invention further eliminates a dicing step and the need to add another plate such as alumina. The use of long, thin cantilevers of low thermal conductivity epoxy to support resistor-carrying silicon members, as disclosed in the present invention is also highly advantageous. Finally, the use of long, thin cantilevers in a low thermal conductivity epoxy base for mounting the flow sensor elements provides a further advantage. These and other objects, features and attendant advantages of the present invention will become apparent to those skilled in the art from a reading of the following detailed description of the preferred embodiment, the accompanying drawings, and the appended claims.

DETAILED DESCRIPTION OF THE PREFERRED EMBODIMENT

The present invention provides for a mass airflow sensor which utilizes an extremely low thermal conductivity material on which to mount silicon members carrying resistors in a flow sensor, resulting in reduced errors due to temperature fluctuations of the airflow and the mounting environment. The flow sensor of the present invention permits added flexibility in design and reduces manufacturing costs.

It is highly desirable, for several reasons, to maximize the thermal impedance of the conductive path existing at the ends of the flow sensor resistors. First, this reduces potential errors due to non-linearities in the resistance versus temperature curve of the resistor material as the temperature of the flowing air varies. Second, this reduces errors due to variations in the temperature of the structure to which the sensor is mounted. In addition, errors due to oily dirt collecting on the cooler end portions of the heated resistors decreases, as well as errors due to drifts in the electronic control circuitry. Further, the power draw is lowered since less heat is conducted away from the sensor, thereby lowering the power lost in the electronics. Also, the power draw is lower because the section of the heated resistor furthest from the supports can be held at a smaller differential temperature above 200° C., the desired average temperature for oil burn off, further decreasing electronics power loss. Finally, the silicon member supporting the resistor can be provided with a larger cross section for increased ruggedness and flow sensitivity while still maintaining low thermal conduction out of the end of the resistor and silicon support.

Air flow sensors must be inexpensive, yet possess a very fast response and be accurate and rugged. These requirements are often conflicting, as evidenced by certain air flow sensors which typically comprise bulky rugged sensing elements resulting in poor response time characteristics because of increased thermal capacity. Conversely, fast responding air flow sensors are typically expensive and have smaller and thus more fragile sensing elements. Moreover, state-of-the-art thermal air flow sensors must be fully inserted into the fluid flow region and, consequently, are subject to destruction and/or deterioration by impacting dirt, dust or other debris in the fluid stream. However, if fragile sensing elements of air flow sensors are strengthened by increasing the cross sectional area thereof, an increase in conductive heat loss from the sensing elements to the support structure is experienced. The present air flow sensor more closely provides all of the features desired including accuracy and a fast response time without substantially increasing the costs of the materials and processing associated with present air flow sensors.

Figure 1:
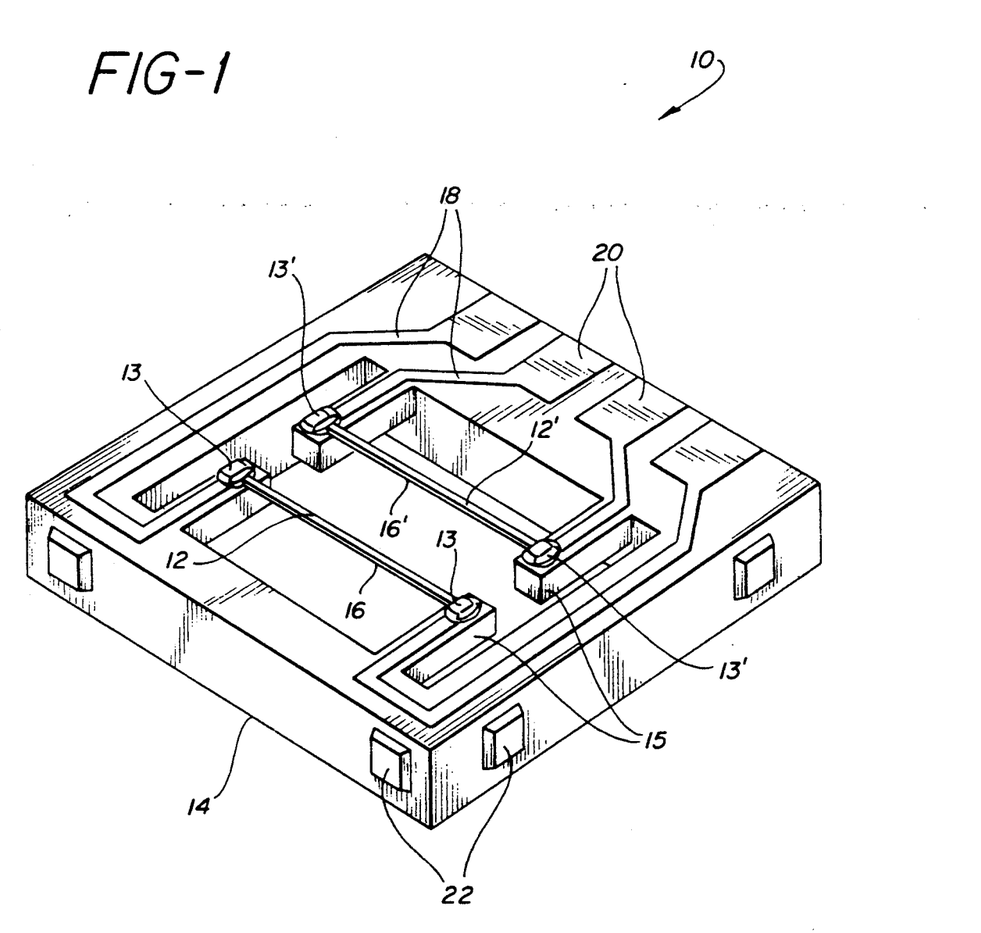
FIG. 1 is a perspective view of an airflow sensor in accordance with an embodiment of this invention.
Figure 3:
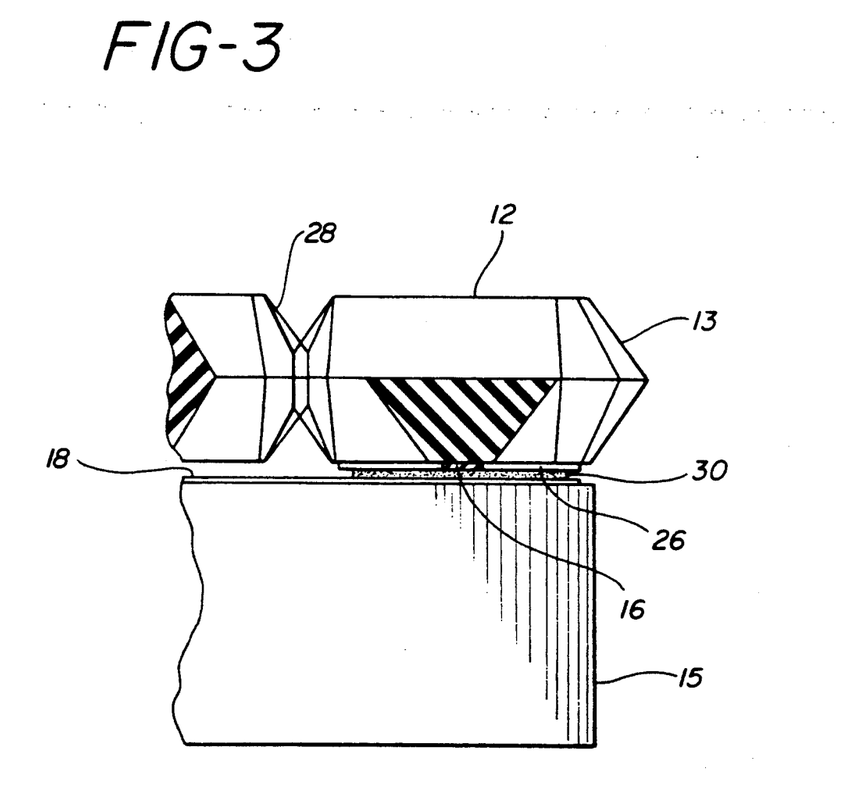
FIG. 3 is a partial enlarged cross-sectional view of a silicon member of FIG. 1.

Referring now to FIG. 1, a flow sensor 10 is illustrated in accordance with the present invention. At least one silicon member 12 having a top side and a bottom side and enlarged ends 13 is attached to a non-silicon, low thermal conductivity epoxy base 14, with the bottom side of the silicon member 12 preferably facing the base 14. The base includes cantilever elements 15 to increase the thermal impedance to heat conducted from resistors which will be mounted thereon. A temperature sensitive resistor 16, best illustrated in FIG. 3, is deposited on an insulating film on the bottom side of each silicon member 12. Electrical conductors, comprised of metal leads 18 and metal pads 20, are molded in or attached to the base 14 to contact the temperature sensitive resistor 16 via low resistive epoxy 30. Consequently, the temperature sensitive resistor 16 is attached to the electrical conductors by the electrically conductive bonding material 30 which also provides a mechanical attachment.

In a preferred embodiment of the present invention, there are four metal leads 18 and four metal pads 20. Additionally, the silicon member 12 preferably comprises a first silicon member 12 and a second silicon member 12'. The silicon members 12 and 12' have a wire-like central section having an elongate shape and enlarged ends 13 and 13'. Further, there are preferably two temperature sensitive resistors 16. A first temperature sensitive resistor 16 is deposited on an insulating film on the bottom side of the first silicon member 12, and a second temperature sensitive resistor 16' is deposited on an insulating film on the bottom side of the second silicon member 12'. Each temperature sensitive resistor 16 and 16' is connected to one or more metal leads 18 which, in turn, is connected to the metal pads 20.

Figure 2:
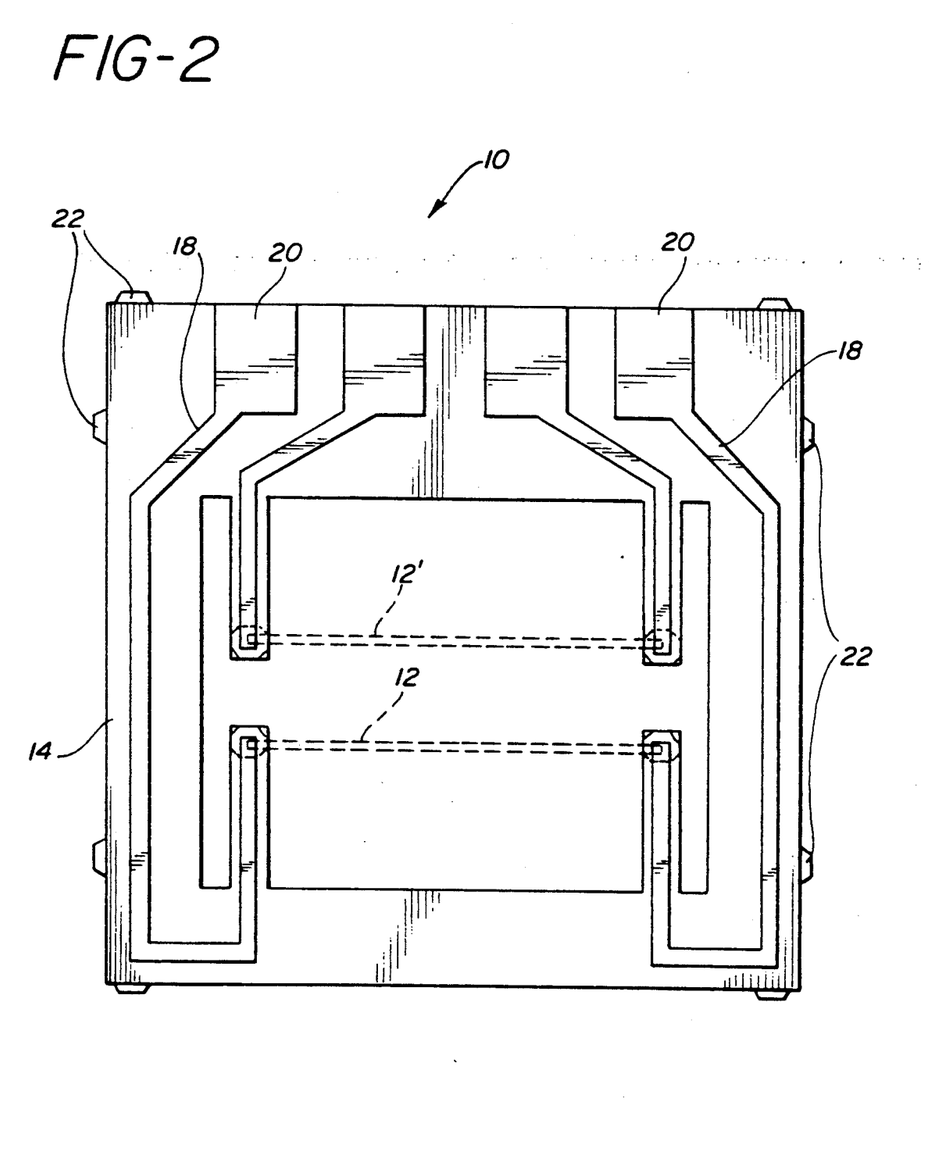
FIG. 2 is a top view of a molded epoxy base with conductors to which, silicon members are attachable in accordance with an embodiment of this invention.

In FIG. 2, a top view of the air flow sensor 10 of FIG. 1 is shown to illustrate fabrication of the flow sensor 10. A teflon or comparable mold is employed to mold the base 14 which is preferably molded out of low thermal conductivity epoxy. The base 14 is typically approximately one centimeter square and 1.5 millimeters thick. In a preferred embodiment of the present invention, numerous bases 14 can be formed simultaneously in a four inch diameter disc, assuming a four inch diameter silicon wafer will be employed for fabricating the silicon parts. About sixty one-centimeter square bases 14 will fit in a four inch circle. The molded epoxy bases 14 are connected to each other by breakoff tabs 22 for eventual separation from each other after the silicon members 12 have been simultaneously attached to the bases 14 and the bases 14 are removed from the mold. In a preferred embodiment, eight breakoff tabs 22 are spaced around the perimeter of the base 14, as best illustrated in FIG. 2. Metal pads 20 and metal leads or conductors 18 are molded in or deposited on the surface of the base 14 for attachment to the temperature sensitive resistors 16 and 16' deposited on silicon members 12 and 12'. Relative placement of silicon members 12 and 12' which carry resistors 16 and 16' is illustrated by the dotted lines in FIG. 2.

In accordance with one aspect of the invention, a method of manufacturing the flow sensor 10 comprises the steps of providing at least one silicon member 12. At least one temperature sensitive resistor 16 is deposited on the bottom side of the silicon member 12. Electrical conductors including metal leads 18 and metal pads 20 are formed on the base 14 to contact the temperature sensitive resistor 16 by high temperature, low resistivity epoxy such as Epotek H20E-175M which serves as both a mechanical bond to the base 14 and an electrical connection to the conductive elements. The molded epoxy used for the base 14 may be Emerson and Cuming 1095 or a comparable epoxy.

FIG. 3 is a partial enlarged cross-sectional view of silicon member 12 before detachment from adjacent silicon in the wafer to illustrate the fabrication of the silicon members 12 and 12'. Fabrication of silicon member 12 involves passivating a silicon wafer on both sides with silicon dioxide and silicon nitride. A silicon dioxide coating and a metal coating on the silicon member 12 allow the structure 10 to function as a hot-wire mass air flow sensor. A platinum or other suitable metal layer is deposited on one side of the silicon wafer and photolithographically patterned to yield resistor 16 atop the insulating film on what will become silicon member 12.

Resistor end pads 26, the broadened areas of resistor material, may be supplemented by additional metal. Standard micromachining techniques are employed to etch windows through the silicon wafer from which the silicon member 12 is fabricated while protecting the resistors 16.

Figure 4:
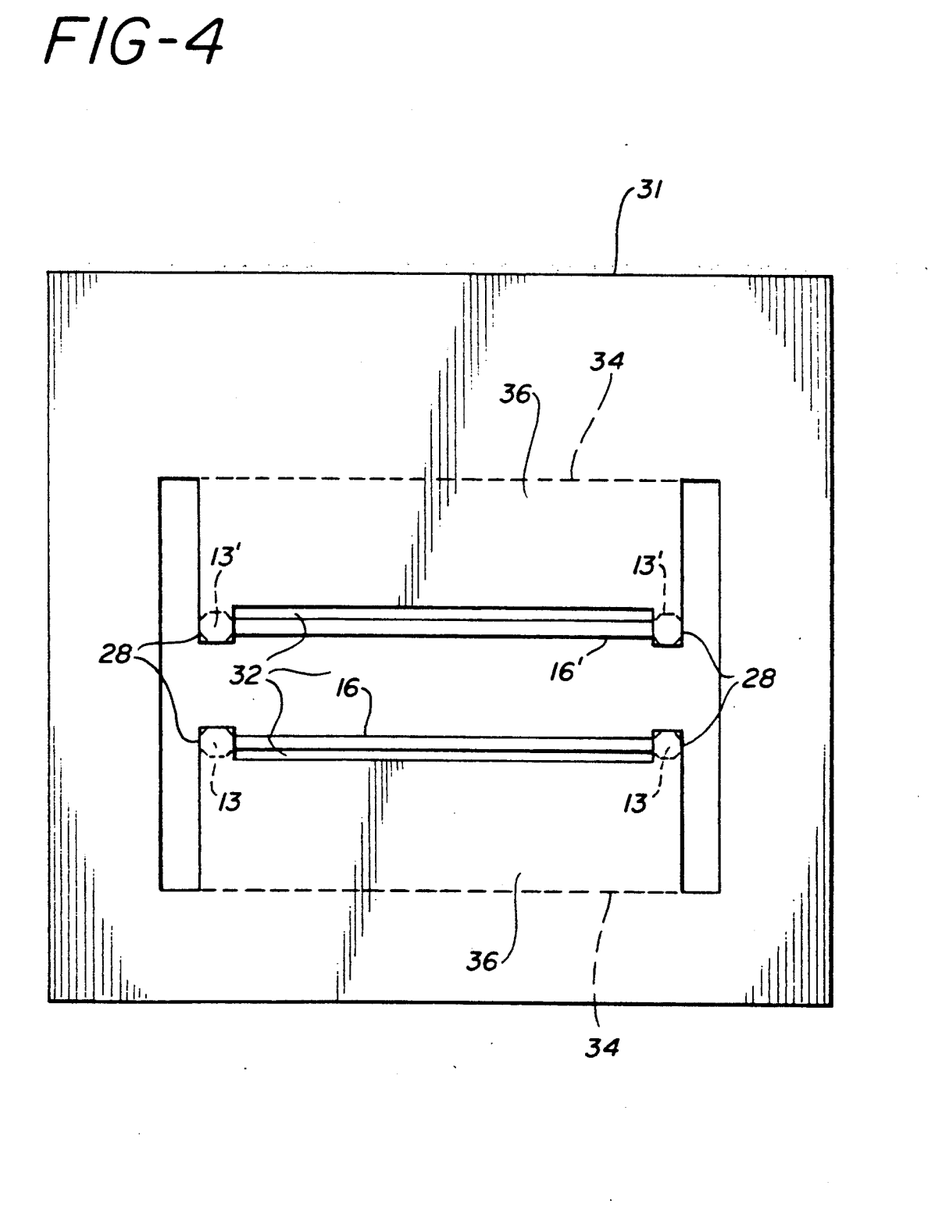
FIG. 4 is a top view of the portion of a silicon wafer slotted to a single sensor.

FIG. 4 shows the area 31 of a silicon wafer allotted to a single sensor after etching has removed three windows 32 and formed notches 28 and shaped the enlarged ends 13 and 13' of silicon members 12 and 12'. The etching also forms two long notches 34 which will permit trap-door-like segments 36 to break out when forces are applied from below. Fracture along the notches 28 and 34 is facilitated by the fact that these notches lie along natural cleavage planes of the silicon crystal. The silicon members 12 and 12' are made separable from a parent wafer by provision of notches 28 and 34 which are formed at the time the silicon members 12 and 12' were formed by etching. This makes possible the simultaneous detachment and mounting of all the silicon members in a silicon wafer onto an array of bases.

In an assembly procedure for eliminating the problems of handling the silicon members individually, the low thermal conductivity epoxy disk is composed of a number of connected, essentially rectangular elements 14 and is placed in a holder. The ends of the cantilevers 15 are supported from below at this time. Such support can be by the lower portion of the mold used to form the epoxy disk elements. Holes are provided in the support below the area where the trap-door-like silicon elements 36 will be positioned to allow a force-generating element to act, as by a mechanical element or a fluid jet. Low resistivity epoxy 30 dots are deposited on the leads 18 near the ends of the cantilevers 15. The silicon wafer that is composed of an equal number of connected rectangular silicon elements 31, as shown in FIG. 4, is lowered, while guided, onto the epoxy disk permitting the resistor end pads 26 to contact the leads 18 via the low resistance epoxy. The silicon disk is held down by a guided, metal, weight disk with the same diameter, approximately, as the silicon and epoxy disks.

Figure 5:
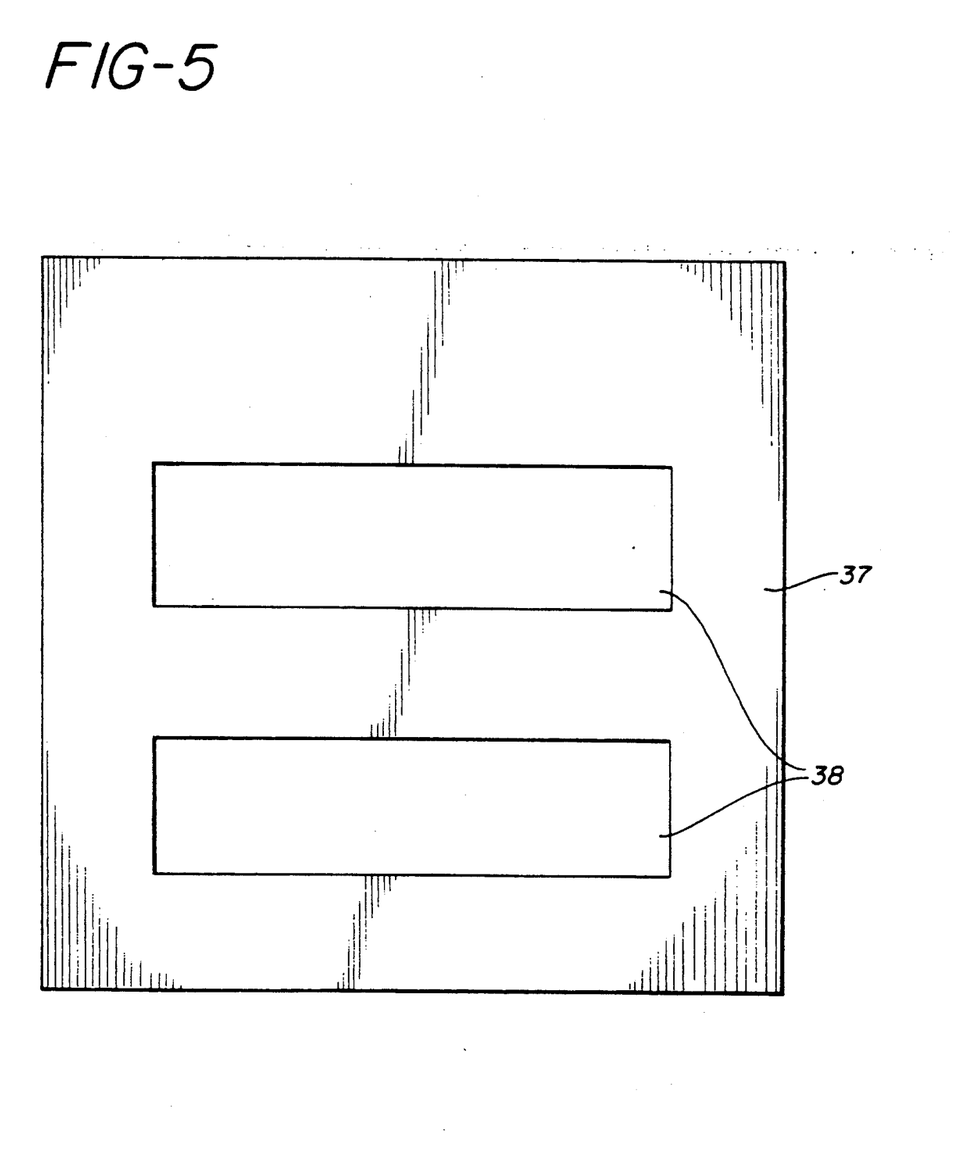
FIG. 5 a top view of the portion of a metal disc which is used to hold down the silicon structure of FIG. 4 while the sensor parts are detached and during curing of the low resistance epoxy.
Figure 6:
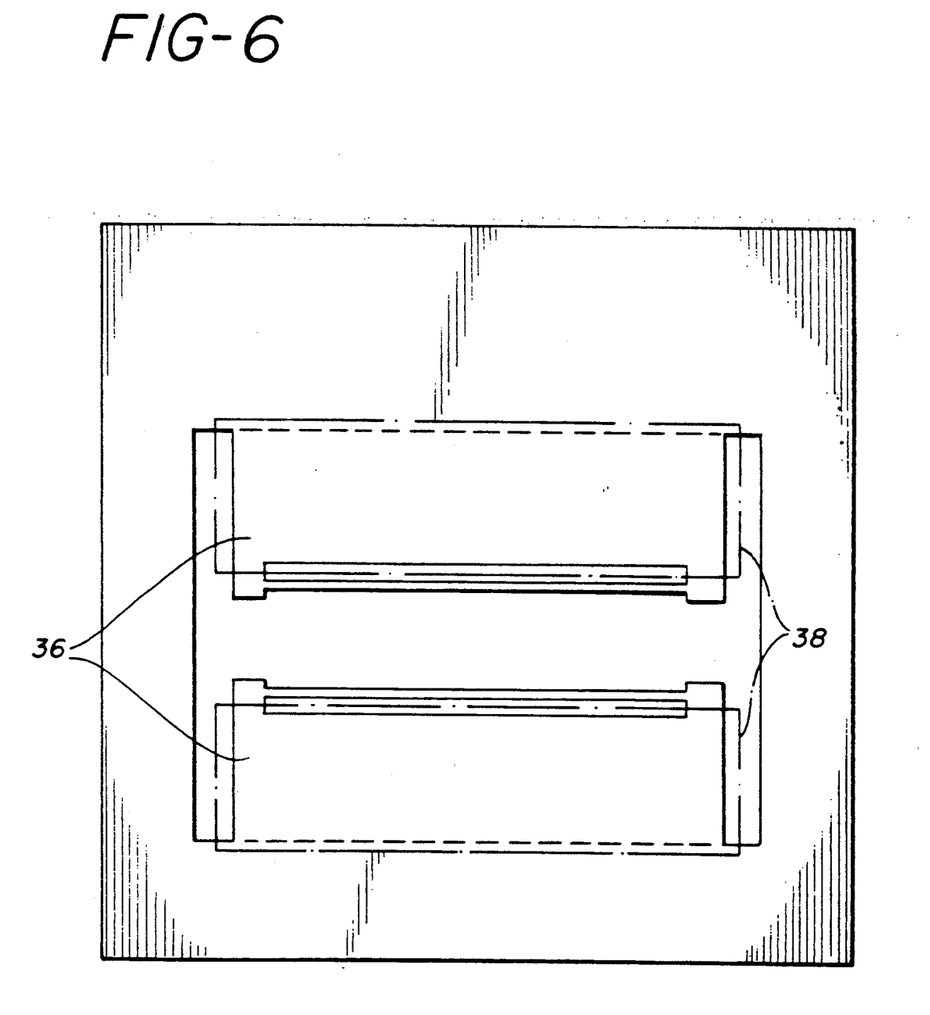
FIG. 6 is a super-position of FIGS. 4 and 5 showing relative placement during detach and cure.

An area 37 of the weight disk allotted to a single sensor is shown in FIG. 5. Rectangular holes 38 are provided in the weight disk to permit the trap-door-like silicon elements 36 to be forced upward. The relative positioning of the holes 38 in the weight disk and the trap-door-like silicon elements 36 is shown in FIG. 6 where it is seen that the weight disk holds down the enlarged ends 13 of the silicon members 12. After the trap-door-like silicon elements 36 are detached by the force from below, the three disk assembly is heated to cure the low resistivity epoxy. After the weight disk is removed and the unused silicon skeleton discarded, the disk of sensors can be removed and separated along the break-off tabs 22.

The use of the extremely low thermal conductivity base 14 on which to mount the silicon members 12 and 12' results in reduced errors and added flexibility in design of the hot-wire mass air flow sensor 10. This structure maximizes the thermal impedance of the conductive path existing at the ends of the flow sensor resistors and minimizes sensor errors.

Having described the invention in detail and by way of reference to preferred embodiments thereof, it will be apparent that other modifications and variations are possible without departing from the scope of the invention defined in the appended claims.

What is claimed is:

1. A flow sensor comprising:
    at least one silicon member having a top side and a bottom side, said at least one silicon member attached to a non-silicon base, said non-silicon base constructed of low thermal conductivity epoxy, and said bottom side of said at least one silicon member facing said non-silicon base;
    at least one temperature sensitive resistor deposited on said bottom side of said at least one silicon member; and
    electrical conductors formed on said non-silicon base to contact said at least one silicon member.

2. A flow sensor as claimed in claim 1 wherein said at least one silicon member has a wire-like central section having an elongate shape and enlarged ends.

3. A flow sensor as claimed in claim 2 wherein said at least one silicon member comprises a first silicon member and a second silicon member.

4. A flow sensor as claimed in claim 3 wherein said at least one temperature sensitive resistor comprises a first temperature sensitive resistor and a second temperature sensitive resistor, said first temperature sensitive resistor deposited on said bottom side of said first silicon member and said second temperature sensitive resistor deposited on said bottom side of said second silicon member.

5. A flow sensor as claimed in claim 1 wherein said base includes cantilever elements upon which contact is made to said at least one silicon member.

6. A flow sensor as claimed in claim 1 wherein said electrical conductors comprise:
    at least one metal lead connected to said at least one temperature sensitive resistor; and
    at least one metal pad connected to said at least one metal lead.

* * * * *